C. P. KLEEBAUER.
FINGER BAG ENVELOP.
APPLICATION FILED APR. 25, 1917.
1,291,024.
Patented Jan. 14, 1919.
3 SHEETS—SHEET 1.
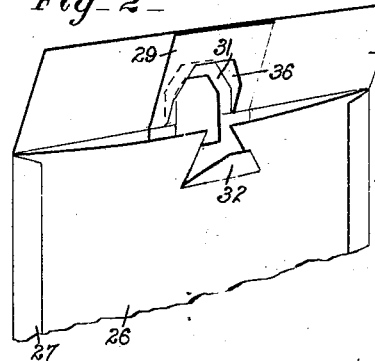
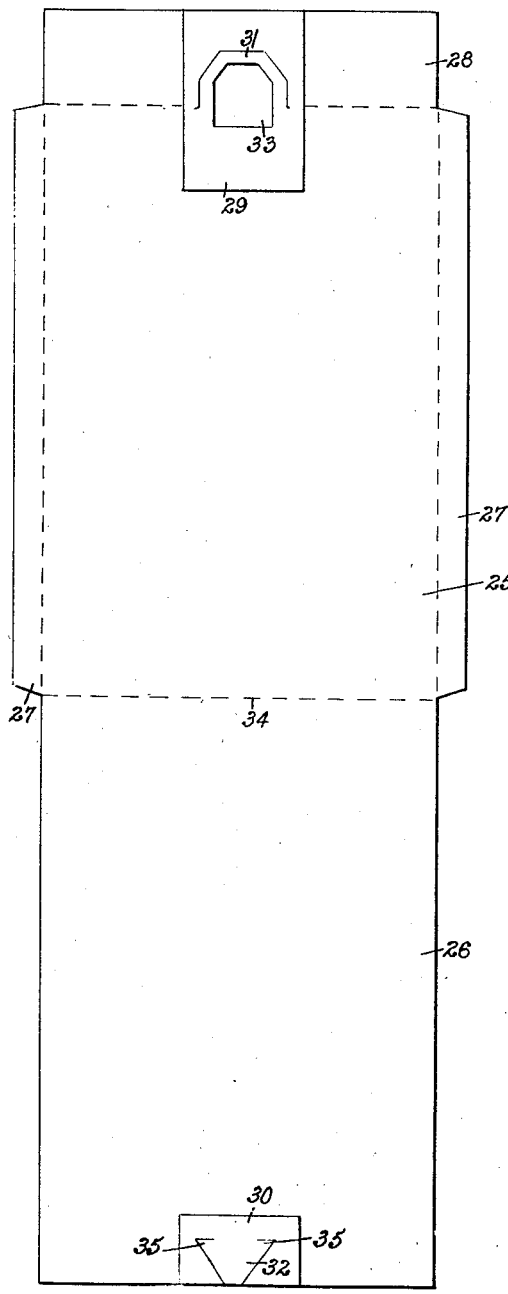
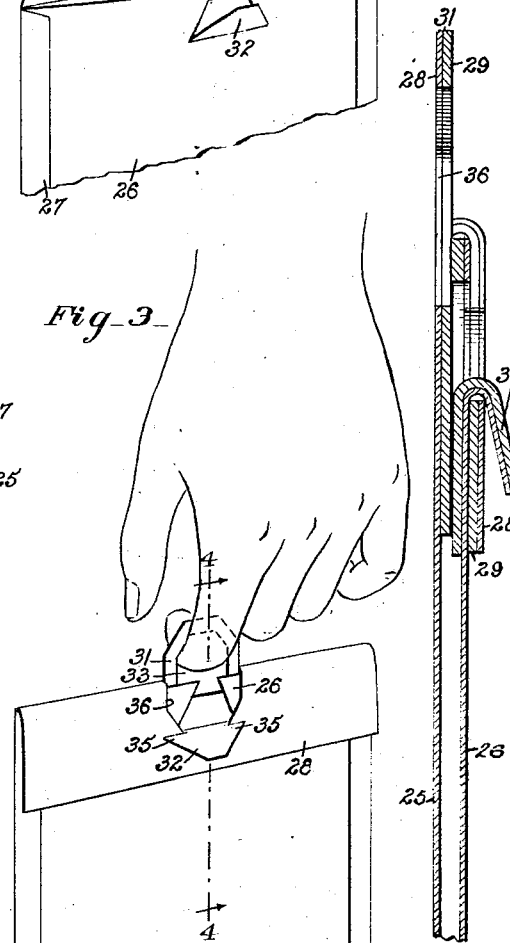
WITNESSES
INVENTOR
C. P. Kleebauer
BY
ATTORNEYS

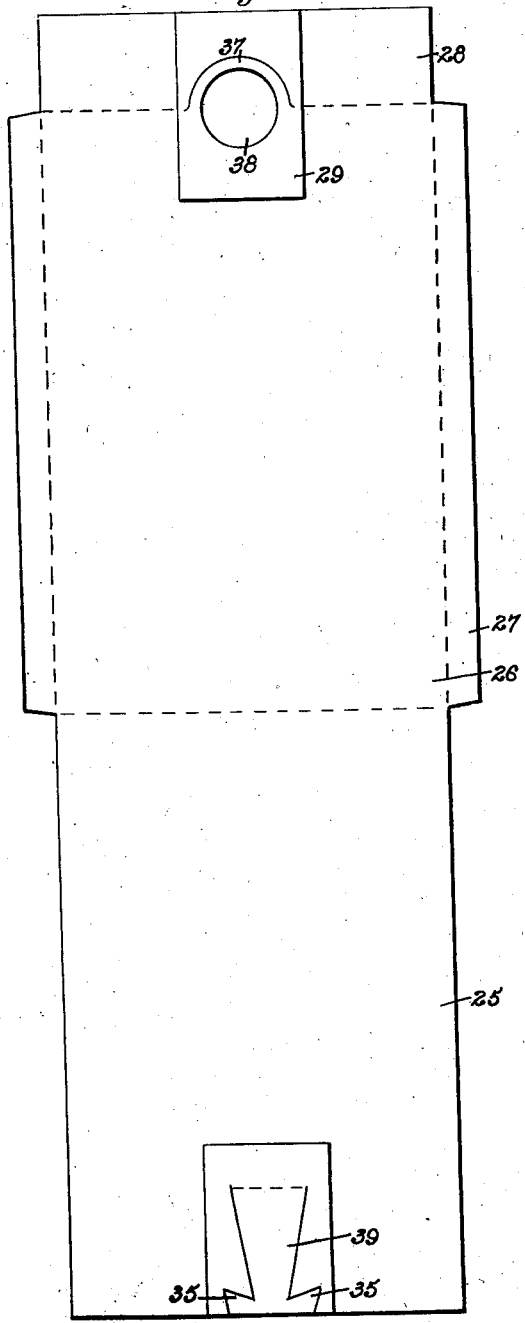
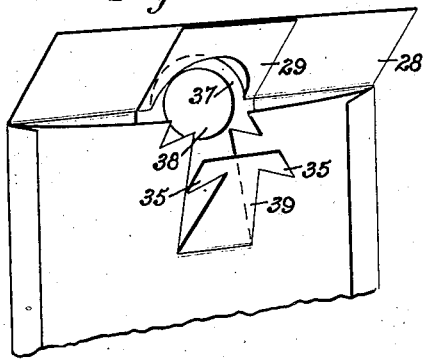
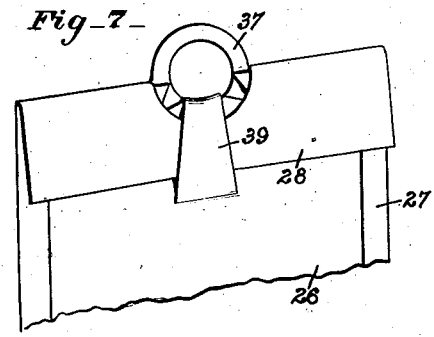
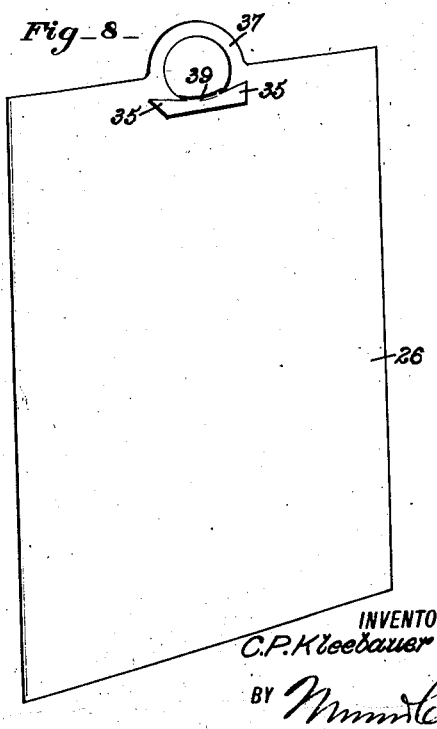

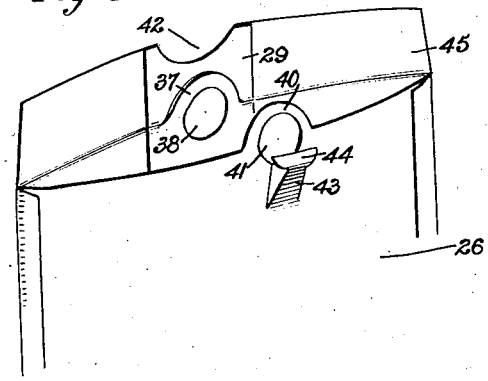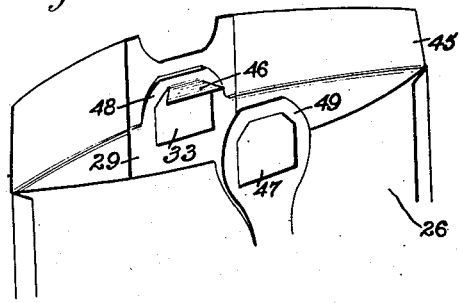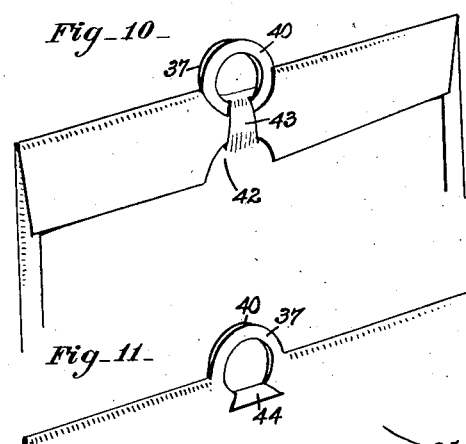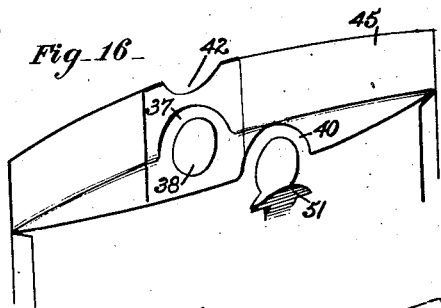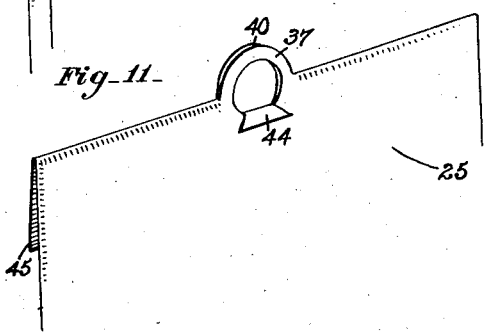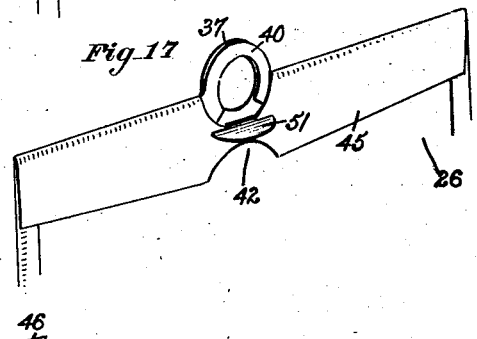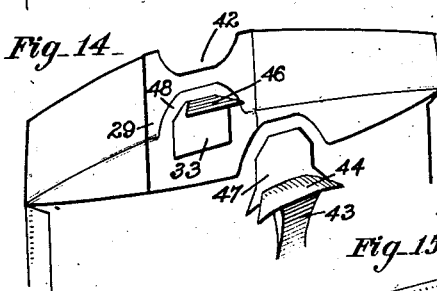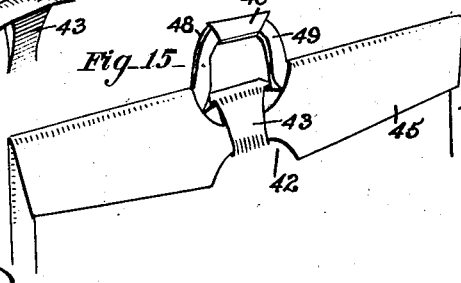

UNITED STATES PATENT OFFICE.

CHARLES P. KLEEBAUER, OF BROOKLYN, NEW YORK, ASSIGNOR TO COHOES ENVELOPE CO., INC., OF COHOES, NEW YORK, A CORPORATION OF NEW YORK.

FINGER-BAG ENVELOP.

1,291,024.

Specification of Letters Patent.

Patented Jan. 14, 1919.

Application filed April 25, 1917. Serial No. 164,389.

*To all whom it may concern:*

Be it known that I, CHARLES P. KLEE-BAUER, a citizen of the United States, and a resident of the city of New York, borough of Brooklyn, in the county of Kings and State of New York, have invented a new and Improved Finger-Bag Envelop, of which the following is a full, clear, and exact description.

Among the principal objects which the present invention has in view are: to provide means for carrying a bag when constructed and arranged in accordance with the present invention; to provide means for securing the bag in closed position; to provide locking means for the bag which may be quickly and readily operated; and to avoid tearing the bag by the weight carried therein.

*Drawings.*

Figure 1 is a view of a blank for forming an envelop constructed and arranged in accordance with the present invention;

Fig. 2 is a perspective view showing a fragment of an envelop constructed and arranged in accordance with the present invention, the closure flap and locking member therefor being shown in open position;

Fig. 3 is a perspective view of a bag constructed in accordance with the present invention, showing in conjunction therewith a human hand to illustrate the method of carrying the bag when so constructed;

Fig. 4 is a cross section on an enlarged scale, of an upper end fragment of a bag, the section being taken as on the line 4—4 in Fig. 3;

Fig. 5 shows an envelop-forming blank for constructing an envelop in accordance with the present invention;

Fig. 6 is a detail view in perspective of an upper end fragment of a modified form of the invention, showing the closure flap and lock therefor in open position;

Fig. 7 is a similar view showing the bag in closed position;

Fig. 8 is a perspective view of the reverse side of the envelop when in closed position;

Fig. 9 is a detail view in perspective of a modified form of the invention, showing the same in the opened position of the envelop;

Fig. 10 is a perspective view of the same, the envelop being shown as in closed position;

Fig. 11 is a perspective view showing the side of the envelop opposite to that shown in Fig. 10;

Fig. 12 shows an envelop constructed and arranged in accordance with a further modification of the invention, the parts being shown as in the position assumed when the envelop is opened;

Fig. 13 is a similar view showing the parts disposed as when the envelop is in closed position;

Fig. 14 is a perspective view of an envelop constructed and arranged in accordance with a further modification of the invention, the parts being disposed as when the envelop is opened;

Fig. 15 is a view of the same when the envelop is closed;

Fig. 16 is a detail view in perspective of the upper end fragment of an envelop constructed to show a further modification of the invention, the parts being disposed as when the envelop is opened;

Fig. 17 is a view of the same showing the parts disposed as when the envelop is closed.

*Description.*

As seen best in Figs. 1 and 5 of the drawings, envelops when constructed and arranged in accordance with the present invention, are preferably made from blanks having a body portion 25, back portion 26, sealing flaps 27, and a closure flap 28, all integrally connected. In practice, the blanks are formed from a continuous web. The web is severed to form individual blanks. The severing cut forms in each completed envelop the opening edge of the back 26 and the free edge of the closure flap 28.

In making envelops constructed and arranged in accordance with the present invention, reinforcing patches are placed on the blank before the back is folded upon the body 25, and there secured by the flaps 27. The patch 29 is adhered to the body structure of the envelop and to extend from the free edge thereof to a point beyond the folding line for the flap when turned upon the body 25. The patch 30 is adhered to the free edge of the back 26. The patch 30 is in line with the patch 29, and the edge thereof is coincident with the edge of said back.

Prior to folding the back 26 on the body 25, the patches 29 and 30 are cut and punched to form a finger bail 31, a dart 32, and an opening 33, respectively. These operations of cutting and punching may be performed simultaneously or successively as the case may be. The patches 29 and 30 and overlaid portions of the envelop having been so treated, the back 26 is folded on the line 34 to overlie the body 25. In this position, it will be found that the dart 32 is disposed below the opening 33 and in line with the opening 36, with the barbs 35 of the said dart extending beyond the side margins of said opening 36. This is the condition of the envelops when placed on the market.

When the bail 31 is formed, the opening 36 is made in the upper end of the patch 29 and in the closure flap 28. When the closure flap is turned over upon the back 26, the marginal edges of the opening 36 overlie the barbs 35 of the dart 32.

To lock the flap 28 in the closure position, it is only necessary to draw the dart 32 through the opening 36, the material of which said dart is constructed yielding to permit the passage of the barbs 35 through the said opening. Upon resumption of the shape of the dart 32 with the extended barbs 35 at the outside of the edge of the opening 36, the flap 28 is held in closed position as shown best in Fig. 3 of the drawings.

It is obvious that when the dart 32 is folded as shown in Fig. 3 of the drawings, any strain exerted on the flap 28 to open the same will dislodge the dart 32, which will continue to operate as a locking member for retaining the flap 28 in closure position. It will also be noted that the bail 31 is extended from the upper edge of the closed envelop in position to be engaged by the finger of the person handling the envelop. By reinforcing the bail 32 and parts contiguous thereto, the danger of tearing the said bail and said parts is avoided.

In Figs. 5 to 8 a modified form of the invention is shown. The modification consists in providing a circular bail 37. The bail 37 is circular in shape as the result of the circular opening 38 formed in the patch 29. A further modification consists in providing an elongated dart 39. The barbs 35 whereof are spread to a wider dimension than the diameter of the opening 38.

As shown best in Fig. 7 of the drawings, when using this modified form of the invention, the flap 28 is folded on the back 26 and between the same and the dart 39. When the dart 39 is closed on the flap 28 and bail 37, it is found that the barbs 35 thereof extend above the lower edge of the opening 38. In this position, it is sufficient to seal the envelop to press on the end of the dart 39, the barbs 35 thereof yielding to admit their passage through the opening 38. At the opposite side of the said opening 38 and of the bail 37, the barbs 35 expand to form an obstruction for the withdrawal of the dart, as shown best in Fig. 8 of the drawings.

The modified form of the invention shown in Figs. 9 to 11, inclusive, provides an auxiliary bail and a central opening 41 therein, said bail and opening being duplicates of the bail 37 and the opening 38 formed in the patch 29 as shown in the modified form above described. The bail 40 is formed by removing the necessary material to form said bail from the patch 29. This results in producing in the said patch an edge recess 42, which recess, as shown best in Fig. 10 of the drawings, receives the body of the dart 43. The dart 43, as shown best in Fig. 9, has a head 44 formed from the material removed from the opening 41. The material can be bent upon itself as shown, to form a reinforced semicircular head, or a portion of the material may be removed to provide substantially the same shape of head.

With the modified form of the invention, the operation of closing consists in placing the bails 37 and 40 in juxtaposed relation and then overturning the closure flap 45 on the back 26, the recess 42 feeding down to the root or base of the dart 43. The dart 43 is then folded over the flap 45, the head 44 alining with the openings 41 and 38. The head is then pressed through the said openings to overlie the body 25 of the envelop as shown best in Fig. 11. In this form of envelop, it will be found that the bails 37 and 40 constitute the carrying member or handle for the envelop.

In Figs. 12 and 13 of the drawings, the modification consists in providing a dart 46 formed of a material removed from the opening 47 in the patch 29. As in the modified form shown in Figs. 9 to 11, inclusive, above described, the bails 48 and 49 correspond in shape.

In practice, when the modified form just above described is employed, the envelop is closed by folding the flap 45 under the tongue 50, which is then moved into juxtaposed relation with the bail 48, the bail 49 of the said dart matching the bail 48. The operator now passes the dart 46 through the openings 47 in the bails 48 and 49. The barbs 35 at the ends of the said dart prevent the retraction of the same. In this form of the invention, it will be noted that the dart 46 forms a pad or smooth carrying member for the envelop.

In Figs. 14 and 15 of the drawings, a further modification is shown wherein the dart 46 is used for uniting the bails 48 and 49, and where the dart 43 is used in conjunction therewith, a double lock being thus formed for holding the flap 45 in closed position and the matched sections of the bail also in closed position.

Figs. 16 and 17 show a modification of the invention wherein the bails 40 and 37 are employed in conjunction with a barb 51 formed by cutting material forming the bail 40, to be overlaid on the flap 45 when the same is folded on the back 26, as shown best in Fig. 17.

Claims.

1. An envelop as characterized comprising a back portion; a body portion; a closure flap; reinforcing patches permanently affixed on said flap and said back portion adjacent the receiving end of said envelop; a carrying bail for said envelop formed integral with said flap and adapted for extension above the top of the envelop in service; and means for locking said envelop in closed position, said means embodying a barbed member integrally constructed with the patch of said back adjacent the receiving end of said envelop, said barbed member being arranged to engage said flap and reinforcing patch thereon.

2. An envelop as characterized comprising a back portion; a body portion; a closure flap; reinforcing patches permanently affixed on said flap and said back portion adjacent the receiving end of said envelop; a carrying bail for said envelop formed integral with said flap and adapted for extension above the top of the envelop in service; and means for locking said flap in closure relation to said envelop, said means embodying an opening formed in said flap and in the reinforcing patch affixed thereto, and a barbed member integral with said back and the patch affixed thereto, said barbed member being arranged to enter the said opening freely and to obstruct the withdrawal therefrom.

CHARLES P. KLEEBAUER.